(12) United States Patent
Morse (10) Patent No.: US 11,048,315 B2
(45) Date of Patent: Jun. 29, 2021

(54) REMOTE WAKE-UP OF MOBILE DEVICES

(71) Applicant: DISPLAYLINK (UK) LIMITED, Cambridge (GB)

(72) Inventor: Douglas Morse, Houghton (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 100 days.

(21) Appl. No.: 15/772,026

(22) PCT Filed: Oct. 18, 2016

(86) PCT No.: PCT/GB2016/053229
§ 371 (c)(1),
(2) Date: Apr. 27, 2018

(87) PCT Pub. No.: WO2017/072484
PCT Pub. Date: May 4, 2017

(65) Prior Publication Data
US 2018/0321728 A1 Nov. 8, 2018

(30) Foreign Application Priority Data
Oct. 28, 2015 (GB) ..................... 1519068

(51) Int. Cl.
*G06F 1/3209* (2019.01)
*G06F 1/3287* (2019.01)
(Continued)

(52) U.S. Cl.
CPC .......... *G06F 1/3209* (2013.01); *G06F 1/1632* (2013.01); *G06F 1/3203* (2013.01);
(Continued)

(58) Field of Classification Search
CPC .. H04M 1/73; H04L 12/40039; Y02D 10/171; Y02D 10/00; G06F 1/3209;
(Continued)

(56) References Cited

U.S. PATENT DOCUMENTS 6,425,040 B1   7/2002  Dewa et al.
6,438,640 B1*  8/2002  Miyamoto ............ G06F 13/385
                                                710/303
(Continued)

FOREIGN PATENT DOCUMENTS

JP   2005018377    1/2005
WO   WO 2005/011182    2/2005
WO   WO 2006/058027    6/2006

*Primary Examiner* — Thomas J. Cleary
(74) *Attorney, Agent, or Firm* — Haynes and Boone, LLP (57) ABSTRACT

A method of controlling a docking station (21) to wake a mobile device (23) from a sleep mode, the mobile device (23) having a data module that is powered off in sleep mode and is capable of transferring data to/from the docking station (21) over a data connection. The mobile device (23) also includes at least one of a power module (211) that is powered on in sleep mode and that is capable of receiving power over a power transfer connection (29b) from a power source (28) in the docking station (21) and a sort-range wireless communication module (46) that is powered on in sleep mode and that is capable of transferring data over a short-range wireless connection (45). The method involves receiving, by the docking station (21) over a Local Area Network, LAN connection, a wake-up message destined for the mobile device (23), generating, by the docking station (21), in response to receiving the wake-up message, a wake-up control signal for transmittal over the power transfer connection (29b) or over the sort-range wireless connection (45) to the mobile device (23), and transmitting the wake-up control signal, from the docking station (21), over the power transfer connection (29b) or over the sort-range wireless connection (45) to the mobile device (23).

12 Claims, 5 Drawing Sheets

(51) Int. Cl.
   *G06F 1/16* (2006.01)
   *G06F 1/3203* (2019.01)
   *H04M 1/73* (2006.01)

(52) U.S. Cl.
   CPC ............. *G06F 1/3287* (2013.01); *H04M 1/73* (2013.01); *Y02D 10/00* (2018.01)

(58) Field of Classification Search
   CPC .... G06F 1/1632; G06F 1/3203; G06F 1/3206; G06F 1/3287; G06F 1/32
   See application file for complete search history.

(56) References Cited

U.S. PATENT DOCUMENTS

| | | | | |
|---|---|---|---|---|
| 6,915,346 | B1* | 7/2005 | Kato | H04L 51/00 709/208 |
| 2002/0037718 | A1* | 3/2002 | Watanabe | H04L 12/12 455/423 |
| 2007/0159136 | A1* | 7/2007 | Culbert | H02J 7/0036 320/128 |
| 2008/0219196 | A1 | 9/2008 | Ptasinski | |
| 2008/0272889 | A1* | 11/2008 | Symons | H02J 50/10 340/10.1 |
| 2010/0041333 | A1* | 2/2010 | Ungari | H02J 7/00 455/41.2 |
| 2010/0201533 | A1* | 8/2010 | Kirby | H02J 7/025 340/636.1 |
| 2010/0231176 | A1* | 9/2010 | Lee | H02J 7/045 320/162 |
| 2010/0281183 | A1 | 11/2010 | Van Bebber | |
| 2012/0214418 | A1 | 8/2012 | Lee et al. | |
| 2013/0084800 | A1* | 4/2013 | Troberg | H02J 50/10 455/41.1 |
| 2013/0103861 | A1 | 4/2013 | Ahn et al. | |
| 2015/0282073 | A1 | 10/2015 | Davidson et al. | |
| 2015/0347738 | A1* | 12/2015 | Ulrich | G06F 21/35 726/17 |
| 2016/0320819 | A1* | 11/2016 | Atkinson | G06F 1/266 |
| 2018/0062422 | A1* | 3/2018 | Kim | H02J 7/025 |
| 2018/0183259 | A1* | 6/2018 | Lee | H04B 1/3838 |

* cited by examiner

REMOTE WAKE-UP OF MOBILE DEVICES

CROSS-REFERENCE TO RELATED APPLICATIONS

This application is a U.S. national stage application under 35 U.S.C. § 371 of International Patent Application No. PCT/GB2016/053229, filed on Oct. 18, 2016, which claims the benefit of Great Britain Patent Application No. 1519068.9 filed on Oct. 28, 2015, the contents of each of which are incorporated herein by reference in their entirety.

BACKGROUND

In some contexts, especially large enterprise networks where functions such as software updates may be performed automatically outside office hours, it is desirable to be able to power on computing devices remotely. This is also true due to the rising popularity of remote working, which may also make it necessary or desirable to be able to power on a computing device remotely. This is conventionally done through special network signals known as Wake-on-LAN signals.

It is becoming increasingly common to use smaller computing devices connected to docking stations in order to provide display, network connectivity, and input peripherals.

Commonly, the mobile computing device, such as a laptop or even a tablet computer or smartphone, is connected to the docking station via a general-purpose connection, usually via a Universal Serial Bus (USB) cable. These mobile devices often do not have an Ethernet connection. Peripherals are connected to the docking station using specific connection methods, and the docking station is then connected to the network and possibly also to a power source if power can be supplied through the general-purpose connection.

A problem arises due to the fact that Wake-on-LAN signals can only be sent through dedicated network connections and there is no reasonable alternative for general-purpose connections as the computing device must be powered on to receive and process general-purpose data packets. For example, it is possible to wake a computing device which is not fully powered off but is only in a sleep mode by the docking station acting as a USB keyboard and sending a keystroke signal to wake the computing device. However, this requires the USB controller on the computing device to be fully active, hence this method is impossible when the computing device is fully powered off or in a sleep state where the USB circuitry is powered down.

Currently, therefore, computing devices must be connected directly to a network in order to be fully wakened when the USB circuitry is powered down.

SUMMARY OF THE INVENTION

Accordingly, in a first aspect, the invention provides a method of controlling a docking station to wake a mobile device from a sleep mode, the mobile device comprising a power module capable of receiving power over a power transfer connection from a power source in a docking station, a data module capable of transferring data to/from the docking station over a Universal Serial Bus, USB connection, the mobile device having a sleep mode in which the data module is powered off and the power module is powered on, whereby the mobile device can be charged from the docking station over the power transfer connection, the method comprising:

receiving, by the docking station over a Local Area Network, LAN connection, a wake-up message destined for the mobile device;

generating, by the docking station, in response to receiving the wake-up message, a wake-up control signal for transmittal over the power transfer connection to the mobile device;

transmitting the wake-up control signal, from the docking station, over the power transfer connection to the mobile device.

According to a second aspect, the invention provides a method of controlling a mobile device to wake from a sleep mode, the mobile device comprising a power module capable of receiving power over a power transfer connection from a power source in a docking station, a data module capable of transferring data to/from the docking station over a Universal Serial Bus, USB connection, the mobile device being in a sleep mode in which the data module is powered off and the power module is powered on, whereby the mobile device can be charged from the docking station over the power transfer connection, the method comprising:

receiving, by the mobile device, a wake-up control signal from the docking station over the power transfer connection; and controlling, by the mobile device in response to receiving the wake-up control signal, the data module to receive power from the power module and to thereby wake from the sleep mode.

In a preferred embodiment, the power transfer connection is a Power Delivery, PD, connection and the wake-up control signal is a PD vendor-defined message.

The power transfer connection may be a wireless charging connection and the wake-up control signal may comprise a modulation in wireless charging. The wake-up message may comprise a Wake-on-LAN signal.

According to a third aspect, the invention provides a docking station comprising:

a Local Area Network, LAN, connection;

a data module configured to send/receive data over a Universal Serial Bus, USB, connection; and a power module configured to transfer power over a power transfer connection;

wherein the docking station is configured to perform a method as described above.

According to a fourth aspect, the invention provides a mobile device comprising:

a power module configured to receive power over a power transfer connection from a power source in a docking station;

a data module configured to transfer data to/from the docking station over a Universal Serial Bus, USB connection;

the mobile device having a sleep mode in which the data module is powered off and the power module is powered on, whereby the mobile device can be charged from the docking station over the power transfer connection, the mobile device configured to perform a method as described above.

According to another aspect, the invention provides a method of controlling a docking station to wake a mobile device from a sleep mode, the mobile device comprising a sort-range wireless communication module capable of transferring data over a short-range wireless connection, a data module capable of transferring data over a wireless Local Area Network, LAN, connection, the mobile device having a sleep mode in which the data module is powered off and the sort-range wireless communication module is powered on, the method comprising:

receiving, by the docking station over a Local Area Network, LAN connection, a wake-up message destined for the mobile device;

generating, by the docking station, in response to receiving the wake-up message, a wake-up control signal for transmittal over the short-range wireless connection to the mobile device;

transmitting the wake-up control signal, from the docking station, over the short-range wireless connection to the mobile device.

According to a further aspect, the invention provides a method of controlling a mobile device to wake from a sleep mode, the mobile device comprising a short-range wireless communication module capable of transferring data over a short-range wireless connection, a data module capable of transferring data over a wireless Local Area Network, LAN, connection, the mobile device having a sleep mode in which the data module is powered off and the sort-range wireless communication module is powered on, the method comprising:

receiving, by the mobile device, a wake-up control signal from the docking station over the short-range wireless connection;

controlling, in the mobile device, in response to receiving the wake-up control signal, the data module to wake from the sleep mode.

In an embodiment, the short-range wireless connection is a Bluetooth connection.

Preferably, the wake-up message comprises a Wake-on-LAN signal.

According to a still further aspect, the invention provides a docking station comprising:

a Local Area Network, LAN, connection;

a data module configured to send/receive data over a wireless Local Area Network, LAN, connection; and     a short-range wireless communication module capable of transferring data over a short-range wireless connection;

wherein the docking station is configured to perform a method as described above.

In another aspect, the invention provides a mobile device comprising:

a data module configured to send/receive data over a wireless Local Area Network, LAN, connection; and     a short-range wireless communication module capable of transferring data over a short-range wireless connection;

the mobile device having a sleep mode in which the data module is powered off and the short-range wireless communication module is powered on, the mobile device configured to perform a method as described above.

By converting the Power-On signal to a USB Power-Delivery (PD) signal, most computing devices are likely to be able to receive such a signal, thus making deployment of the system more straightforward, and PD signalling is directed to the power supply and associated controllers of the computing device, which is the appropriate component for powering on the computing device. USB is also a common connection method between a docking station and a computing device, further making this method preferable.

Alternatively, the Power-On signal could be converted to any other signalling type that can be received by the computing device without requiring significant functionality to be powered when the computing device is switched off. A second signal addressed to the power supply and associated controllers can then be generated by the module that receives the signal. A wireless example is Bluetooth, which requires a similar low-power receiver module to PD signalling.

Some embodiments of the invention allow Power-On signals to be passed along a general-purpose connection to the computing device without requiring the device to keep a module specifically powered on to listen for such signals, as would be necessary if an ordinary USB signal were used: the USB controller on most computing devices requires considerable power, while the PD controller requires very little and allows the USB controller to be powered off. The same is correspondingly true of the Bluetooth and Wi-Fi controllers.

BRIEF DESCRIPTION OF THE DRAWINGS

Embodiments of the invention will now be more fully described, by way of example, with reference to the drawings, of which.

DETAILED DESCRIPTION OF THE DRAWINGS

In this description, the following terms will be used. They are for convenience only, indicating what may be meant by these terms in some embodiments, but are not intended to limit the scope of the invention in any way:

Powered On: Normal operating state, in which the computing device has fully-active functionality ("powering on" being the process of reaching this state).

Powered Off: A state in which the computing device is unresponsive and power is not supplied to most components, apart from a minimum few required for the computing device to be powered on, for example, a power button may still be operational. This state is sometimes referred to as a standby power state.

Sleep: A semi-powered-off state in which the computing device is unresponsive to most input but some additional components are powered, including RAM. There may be different sleep states having different levels of sleep where more or fewer components are powered, even if the device is not Powered On. This state is sometimes known as standby or hibernation.

Figure 1:
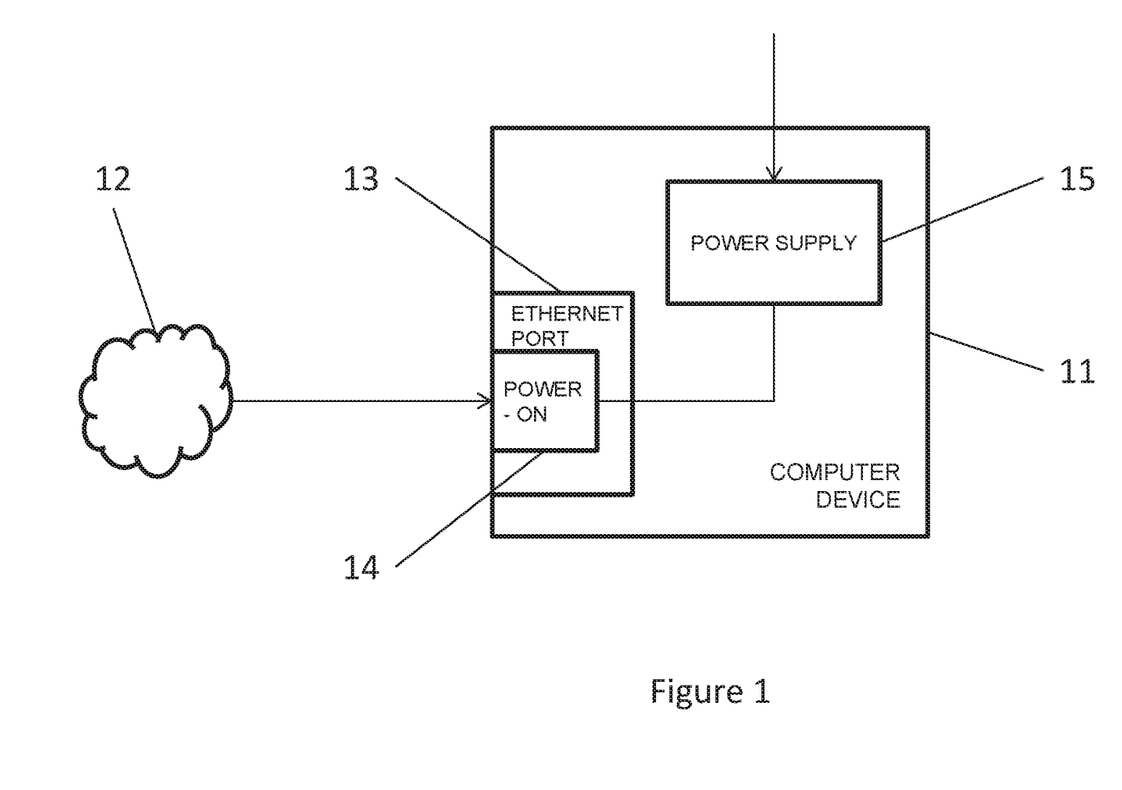
FIG. 1 shows a basic schematic of relevant components of a conventional computing device.

FIG. 1 shows a basic schematic of a conventional mobile computing device [11]. Although, in practice there will be other components included in such a device, only the relevant ones are shown here. These include a Power-on module [14], which is part of an Ethernet port [13] and connected to an internal power supply [15]. This Power-on module [14] is designed to receive Wake-on-LAN packets and power on the computing device [11]. As such, it is connected to a network [12] via the Ethernet connection, which is likely to be a cable plugged into the Ethernet port [13] but may be wireless.

Conventionally, a Power-on signal arrives from the network [12] via the Ethernet connection and is received by the Power-on module [14]. This then signals the power supply [15] and causes the computing device [11] to power on. Such signals can only be received over an Ethernet connection, which means that they cannot be sent via a docking station.

As previously mentioned, it is possible to wake a computing device—i.e. cause it to enter a powered on state from a sleep state—via a Wake-on-LAN signal received by a docking station connected to the computing device by USB, but this requires the docking station to send a USB signal and therefore the USB controller on the computing device must be active. This means that such a function cannot be used when the computing device is powered off or in a sleep state in which the USB controller is not powered. Leaving the computing device in such a less deep sleep state at all times is not desirable because it means that power must be supplied to components which are not being used, resulting in considerable power wastage.

Figure 2:
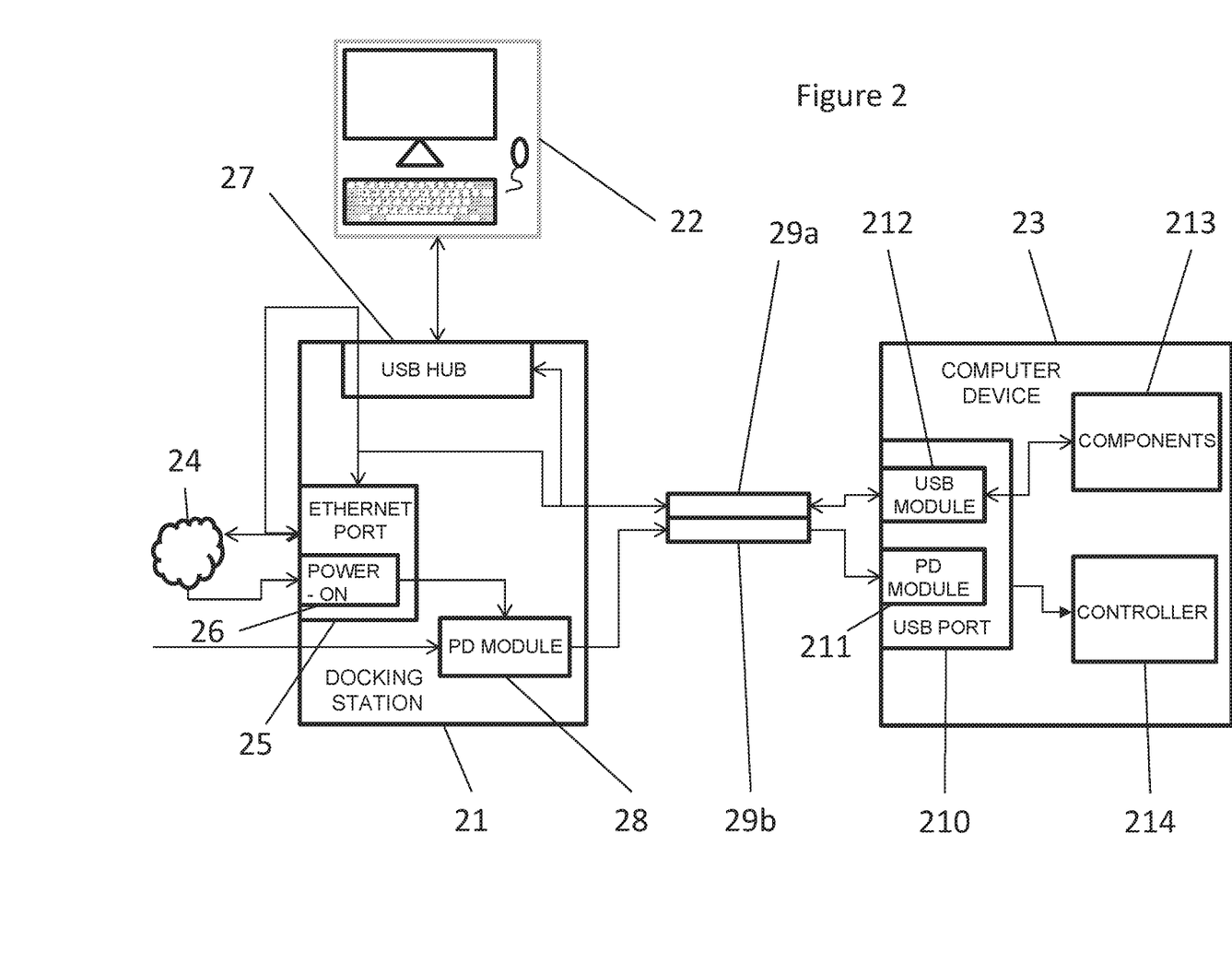
FIGS. 2, 3, and 4 show example schematics of three systems arranged according to embodiments of the invention.

FIG. 2 shows a basic schematic of an example system of an embodiment of the invention in order to provide Power-on signals over a general-purpose connection from a docking station [21].

In this embodiment, the mobile computing device [23] is connected to a docking station [21] that includes a USB hub [27] which is connected via a USB connection to a collection of peripherals [22]. The docking station [21] also includes a Power Delivery (PD) module [28] which is connected to a power supply from mains electricity, although in other embodiments it could be possible for it to be connected to a battery or another power source, or even that the dock does not provide power but is still able to send and receive USB-PD messages.

There is also a network port [25] which is connected to a network [24] via an Ethernet cable, although as previously described it could be wireless and/or using a different network protocol. The network port [25] also includes a Power-on module [26] similar to that included in the Ethernet port [13] on the mobile computing device [11] shown in FIG. 1. This Power-on module [26] is shown with a separate connection to the network [24] for clarity, but it will receive Power-on signals over the same physical connection as the Ethernet port [25] uses to receive and transmit data. The Power-on module [26] is connected to the PD module [28] and able to send signals to it. The PD module [28] is able to exchange messages with a corresponding module [211] on the mobile computing device [23], which is incorporated into a USB port [210] on the computing device [23]. Both the PD module [28] and the USB hub [27] are shown connected to a cable [29], which is shown in the diagram in two parts although may be a single cable. The first part of the cable [29a] carries USB data, which includes graphics, audio, and human interface data addressed to or originating from the peripherals [22], as well as network data addressed to or originating from the Ethernet port [25]. As such, the Ethernet port [25] is also connected to the data part of the cable [29a]. The second part of the cable [29b] carries power and the accompanying PD signalling, which may include messages. These messages will include standard messages as previously mentioned, which may perform functions such as identifying the power supply and ensuring that any charging or power supply functionality can be carried out correctly. The PD protocol also allows the power part of the cable [29b] to carry vendor-defined messages. In a USB Type-C cable, for example, the first part of the cable [29a] comprises the data lines and the second part of the cable [29b] comprises the CC pins, which carry the PD signalling, and the VBus line, which carries power.

The cable [29] is connected to a USB port [210] on the mobile computing device [23], which incorporates a PD module [211] and a USB module [212]. The latter handles data and is connected to other components [213] on the computing device [23], such as a processor, a hard disk, etc. The PD module [211] is connected to an internal power supply and associated controller [214]. It is powered from the connected docking station [21] and can be "on" even when the rest of the computing device [23] is powered off or in a sleep state.

There are a limited number of USB-PD messages included in the USB standard specification, but this number can be extended by vendor-defined messages, which are sent using the USB-PD CC pin connection [29b] in the same way as the standard messages and can be amended by, for example, a docking station manufacturer. The method for sending these messages is outlined in the USB standard and means are available to those skilled in the art. Such a message can be used to provide a Power-on signal to the computing device [23] over the USB connection [29]. Since it is a PD signal, it can be passed directly to the power supply and associated controller [214] on the computing device [23]. The new vendor-defined message thereby acts as an instruction to power on the computing device [23] even when the main USB module [212] and other USB components are not powered. The PD module [211] on the computing device [23] is the only item that needs to be powered on and can derive its power from the docking station [21] power supply over the USB Vbus connection [29] or from the power supply [214] of the computing device [23] itself.

Figure 3:
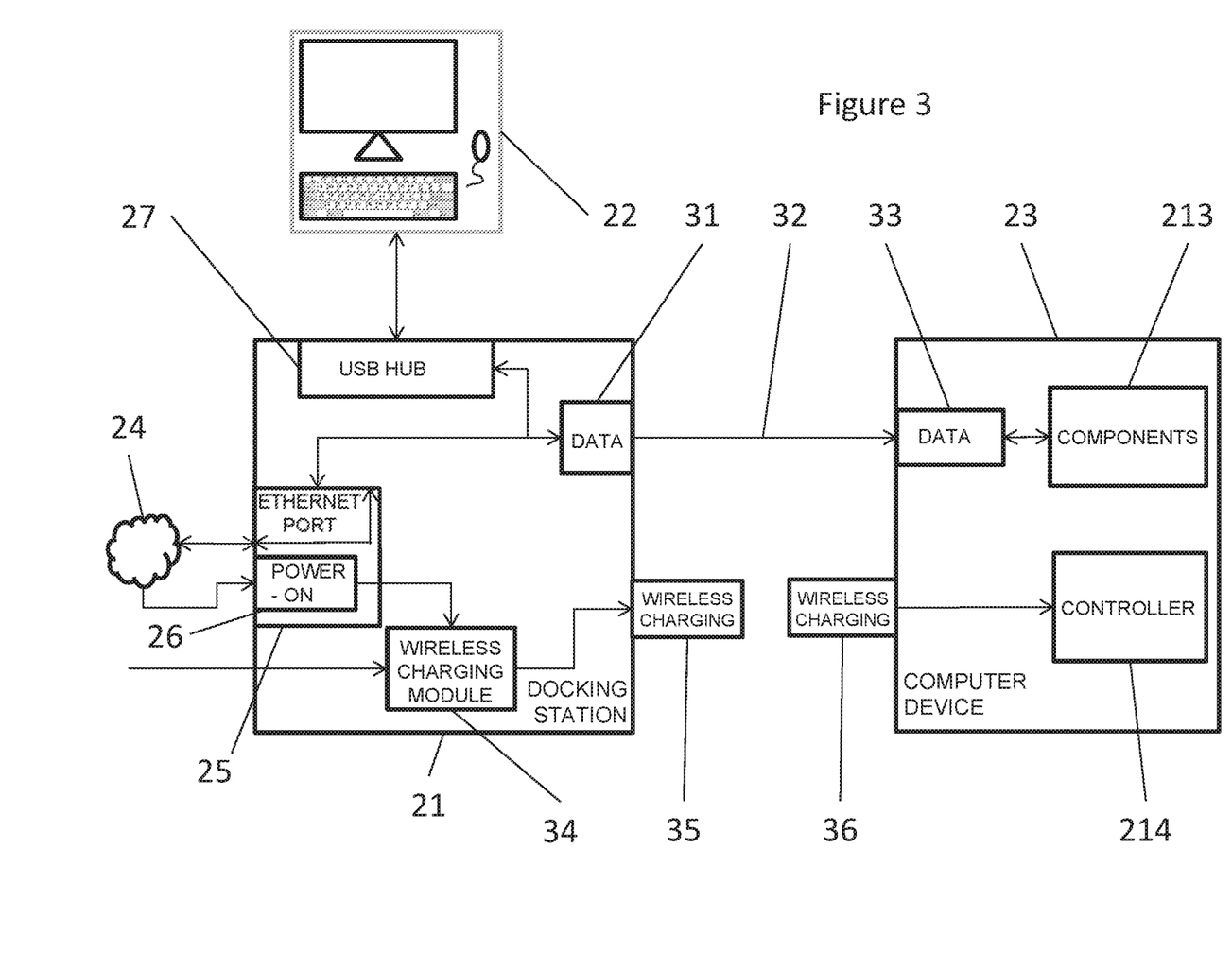

FIG. 3 shows a similar docking station [21] connected to a collection of peripherals [22] via a USB hub [27] and a network [24] via an Ethernet port [25]. Like the Ethernet port [25] in the docking station [21] shown in FIG. 2, this Ethernet port [25] includes a Power-on module, in this embodiment connected to a wireless charging module [34]. This wireless charging module [34] is connected to a wireless charging output [35] which may comprise, for example, a set of electromagnetic coils which induce a current in corresponding coils [36] on the computing device [23]. The wireless charging module [34] is connected to a power supply in the same way as the PD module [28] of FIG. 2.

There is also a data connection module [31], which has a connection [32] to the computing device [23]. This may be wired through a similar USB connection [29] to that shown in FIG. 2 but without the PD signalling, since charging and associated signalling are occurring wirelessly. Alternatively, this connection may be wireless, for example over a wireless LAN connection such as Wi-Fi, a short-range wireless connection such as Bluetooth, or even an optical connection. In any case, the data connection module [31] on the docking station [21] will be configured appropriately.

The computing device [23] has corresponding modules [36, 33] for connection to the wireless charging output [35] and the data connection module [31] on the docking station [21]. It is likely that the wireless charging input [36] on the computing device [23] will comprise electromagnetic coils that produce a current that can be used to power the computing device [23] when aligned with similar coils in the wireless charging output [35] on the docking station [21]. Alternatively, there may be direct electrical contacts, for example in a cradle. In any case, there will be a method of signalling between the wireless charging module [34] and the wireless charging input [36] via the wireless charging output [35] in order to carry information about the charging connection in the same way as PD messages may behave in USB connections and charging. The wireless charging input [36] will therefore include an appropriate controller [214].

Similarly to the embodiment shown in FIG. 2, the wireless charging input [36] is connected to the controller [214]

on the computing device [23], which is able to send messages and signals to it. The data receiver module [33] is appropriately configured for the data connection [32] and is connected to the other components [213] on the computing device [23], which may include a processor and memory as previously described. Because the wireless charging input [36] and its controller [214] require very little power and will be supplied with power by the docking station [21], they can be left active even when the computing device [23] is otherwise powered off.

Figure 4:
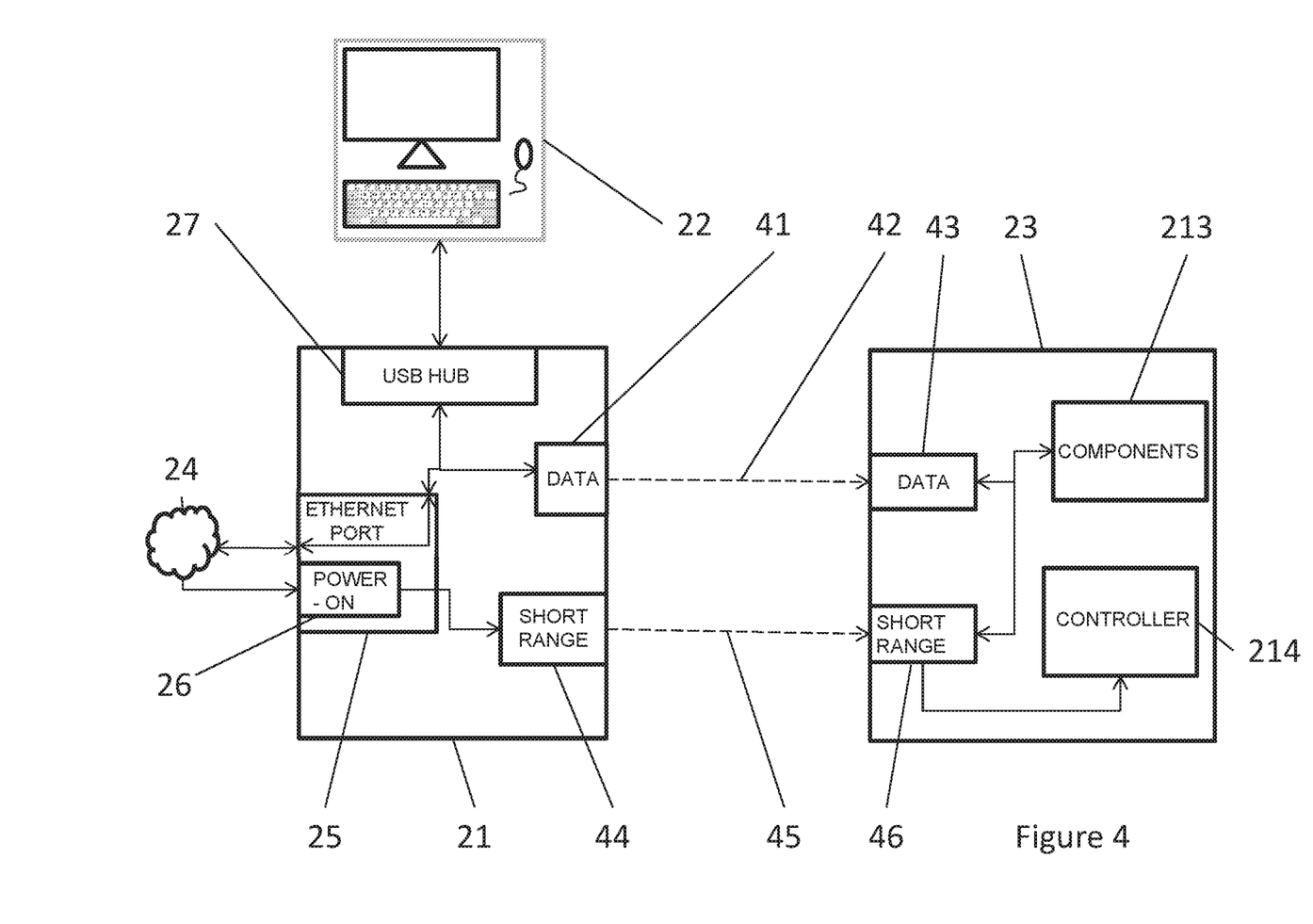

FIG. 4 shows a second similar docking station [21] connected to a collection of peripherals [22] via a USB hub [27] and a network [24] via an Ethernet port [25]. Like the Ethernet port [25] in the docking stations [21] shown in FIGS. 2 and 3, this Ethernet port [25] includes a Power-on module [26]. In this embodiment, however, the Power-on module [26] is connected to a short-range wireless connection module [44]. In this example, this module [44] can connect to a properly-configured computing device [23] wirelessly via Bluetooth [45]. This is a short-range connection method that is not related to the power supply but can be run on less power than a full wireless connection.

There is also a wireless LAN module [41] which in this embodiment can connect to the computing device [23] using Wi-Fi [42]. Since this is a full wireless network connection it requires more power than the short-range wireless connection [45]. The wireless LAN module [41] is connected to the USB hub [27] and is able to exchange data with the peripherals [22] and a connected computing device [23].

The computing device [23] is also similar to that shown in FIG. 2, having an internal power supply [214] and other components [213] such as a processor, hard drive, etc. It also has a Wireless LAN module [43], which is able to transmit and receive wireless LAN signals, and, in this embodiment, a Bluetooth module [46] which is able to transmit and receive Bluetooth signals [45] over short distances. Since the Bluetooth connection [45] can carry data, the Bluetooth module [46] is connected to the other components [213], as is the Wireless LAN module [43]. The Bluetooth module [46] is further connected to the power supply [214] so that it is able to send signals to it, including special inputs triggered by the receipt of Power-on signals from the docking station [21].

The Wireless LAN module [43] is usually more powerful than the Bluetooth module [46] because it carries more data across a larger range. As such, it requires more power and it is advantageous to be able to turn it off when the computing device [23] is powered off or in a sleep state. The Bluetooth module [46], however, requires less power and could be kept running when the computing device [23] is powered off or in a sleep state, especially if the computing device [23] were connected to a power supply of some kind.

In some embodiments, the Bluetooth modules [44, 46] may be incorporated into a wireless charging interface and used for wireless charging signalling as described in FIG. 3. In this case, the actual interaction will be much the same as in the embodiment shown in FIG. 4 as the charging elements of the connection will not be involved in signalling. Furthermore, the Bluetooth modules [44, 46] may be powered from the docking station [21].

Figure 5:
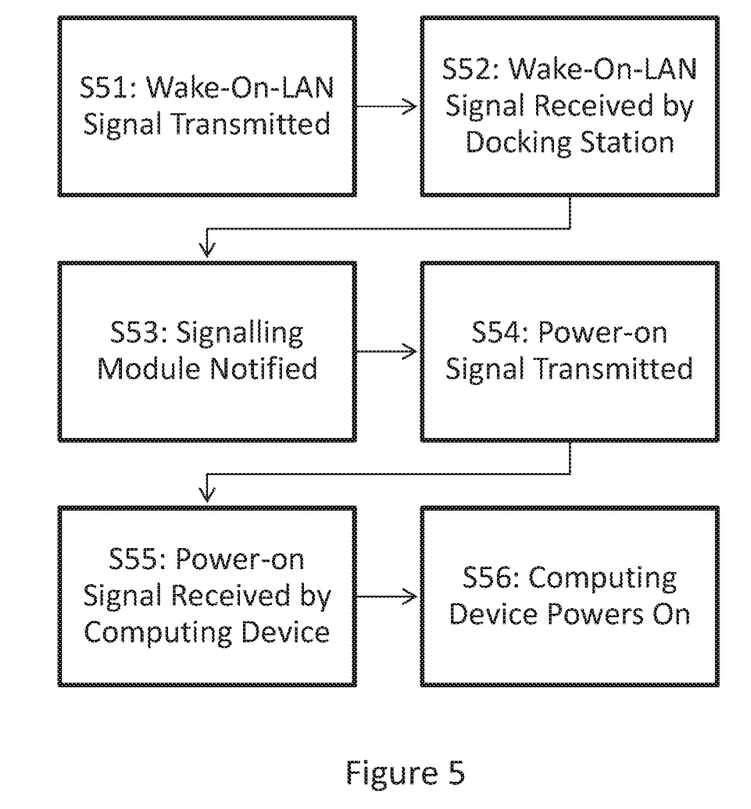
FIG. 5 shows the process used in the embodiments shown in FIGS. 2, 3, and 4.

FIG. 5 shows the process followed in order to power on a computing device across a network using a Wake-on-LAN signal, in the embodiments of the invention shown in FIGS. 2, 3, and 4. First, at Step S51, a Wake-on-LAN signal is transmitted over the network [24], for example by an IT administrator or automatically in order to perform an update. The signal is received through the Ethernet connection by the docking station [21], via the network port [26], at Step S52. Specifically, it is received by the Power-on module [26] incorporated into the Ethernet port [26]. This is able to identify it as a Wake-on-LAN signal. So far, all three embodiments operate in the same way.

At Step S53, the docking station [21] generates a wake-up control signal for transmission to the computing device [23]. The details of this depend on the embodiment.

In the embodiment shown in FIG. 2, the Power-on module [26] sends an internal message to the PD module [27]. This then generates a special vendor-defined PD message which can be transmitted through the PD connection that is included in the USB connection [29].

In the embodiment shown in FIG. 3, the Power-on module [26] sends an internal message to the wireless charging module [34]. This will have a method of signalling and a similar set of vendor-defined messages as well as standard messages. It therefore generates an appropriate signal for transmission across the wireless charging connection between the wireless charging output [35] and wireless charging input [36]. For example, this may comprise turning the supplied power off and on in a particular pattern, or modulating its power in a particular way without turning it off.

In the embodiment shown in FIG. 4, the Power-on module [26] sends an internal message to the short-range wireless connection module [44], which creates a signal to be sent, in this case, over the Bluetooth connection [45] to the computing device [23].

Whichever method is used, the appropriate wake-up control signal is transmitted at Step S54. In the embodiments shown in FIGS. 2 and 3, the wake-up control signal will be transmitted over the appropriate power transfer connection; in the embodiment shown in FIG. 4 it will be transmitted over the Bluetooth connection or whichever short-range wireless connection is used.

At Step S55, the wake-up control signal is received by the computing device. In the embodiment shown in FIG. 2, it will be received by the PD module [211] on the computing device [23]; in the embodiment shown in FIG. 3, it will be received by the wireless charging input's [36] controller; and in FIG. 4, it will be received by the Bluetooth module [46].

The respective receiving module [211, 36, 46] will then send an internal message to the computing device's [23] internal power supply [214]. In the embodiments shown in FIGS. 2 and 3, the wake-up control signal was received through the power transfer connection and therefore can be passed directly to the power supply; in the embodiment shown in FIG. 4, the Bluetooth module [46] will generate a special internal message to the power supply [214].

In any case, the signal sent at Step S55 causes the power supply [214] to supply power to the rest of the computing device [23] and this means that the computing device [23] powers on at Step S56. It can then be used as normal.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the modules may be embodied in one or more hardware processing device(s) e.g. processors and/or in one or more software modules, or in any appropriate combination of hardware devices and software modules.

Furthermore, software instructions to implement the described methods may be provided on a computer readable medium.

The invention claimed is:

1. A method of controlling a docking station to wake a mobile device from a sleep mode, the docking station comprising a wireless charging module and an ethernet port having a power-on module contained therewithin, wherein the wireless charging module is connected to the power-on module of the ethernet port, the mobile device comprising a power module that is configured, in the sleep mode, to receive power over a wireless charging connection provided via the wireless charging module of the docking station to charge the mobile device, the method comprising:
receiving, by the docking station over a Local Area Network (LAN) connection, a wake-up message destined for the mobile device;
generating, by the docking station, in response to receiving the wake-up message, an information-containing wake-up control signal for transmittal over the wireless charging connection to the mobile device; and
transmitting the information-containing wake-up control signal, from the docking station, over the wireless charging connection to the mobile device that causes the mobile device to wake from the sleep mode,
wherein:
the information-containing wake-up control signal is distinct from the power used for charging the mobile device; and
the information-containing wake-up control signal comprises a modulation in wireless charging or other messages across the wireless charging connection.

2. The method according to claim 1, wherein the wake-up message comprises a Wake-on-LAN signal.

3. The method according to claim 1, wherein the mobile device comprising a short-range wireless communication module configured for transferring data over a short-range wireless connection.

4. The method according to claim 1, wherein the docking station further comprises a Universal Serial Bus (USB) data module capable of transferring data to/from the docking station over a wired or wireless USB data connection, wherein, in the sleep mode, the USB data module is powered off and the power module is powered on.

5. A method of controlling a mobile device to wake from a sleep mode, the mobile device comprising a power module that is configured, in a sleep mode, to receive power over a power transfer connection via a wireless charging module of a docking station to charge the mobile device, the docking station comprising the wireless charging module and an ethernet port having a power-on module contained therewithin wherein the wireless charging module is connected to the power-on module of the ethernet port, the method comprising:
receiving, by the mobile device, an information-containing wake-up control signal from the docking station over the power transfer connection; and
controlling, by the mobile device in response to receiving the information-containing wake-up control signal, a Universal Serial Bus (USB) data module that is configured to receive power from the power module and to thereby, configured to wake the mobile device from the sleep mode,
wherein:
the information-containing wake-up control signal is distinct from the power used for charging the mobile device; and
the power transfer connection is a wireless charging connection provided via the wireless charging module and the information-containing wake-up control signal comprises a modulation in wireless charging or other messages across the wireless charging connection.

6. The method according to claim 5, wherein the mobile device comprising a short-range wireless communication module configured for transferring data over a short-range wireless connection.

7. The method according to claim 5, wherein the docking station further comprises a Universal Serial Bus (USB) data module capable of transferring data to/from the docking station over a wired or wireless USB data connection, wherein, in the sleep mode, the USB data module is powered off and the power module is powered on.

8. A docking station comprising:
a Local Area Network (LAN) connection;
an ethernet port having a power-on module contained therewithin;
a Universal Serial Bus (USB) data module configured to send/receive data over a wired or wireless USB data connection; and
a wireless charging module connected to the power-on module of the ethernet port, the wireless charging module configured to transfer power over a power transfer connection;
wherein the docking station is configured to wake a mobile device from a sleep mode, the mobile device comprising a power module that is configured, in a sleep mode, to receive power over the power transfer connection from the wireless charging module to charge the mobile device, the USB data module capable of transferring data to/from the USB data module of the docking station over the USB data connection, wherein, in the sleep mode, the USB data module of the mobile device is powered off and the power module is powered on, whereby the mobile device is charged from the docking station over the power transfer connection, the docking station configured to:
receive, over the LAN connection, a wake-up message destined for the mobile device;
generate, in response to receiving the wake-up message, an information-containing wake-up control signal for transmittal over the power transfer connection to the mobile device;
transmit the information-containing wake-up control signal over the power transfer connection to the mobile device that causes the mobile device to wake from the sleep mode,
wherein:
the information-containing wake-up control signal is distinct from the power used for charging the mobile device; and
the power transfer connection is a wireless charging connection provided via the wireless charging module and the information-containing wake-up control signal comprises a modulation in wireless charging or other messages across the wireless charging connection.

9. The docking station according to claim 8, wherein the wake-up message comprises a Wake-on-LAN signal.

10. The docking station according to claim 8, wherein the mobile device comprising a short-range wireless communication module configured for transferring data over a short-range wireless connection.

11. A mobile device comprising:
- a power module configured to receive power, when in a sleep mode, over a power transfer connection via a wireless charging module of a docking station to charge the mobile device, the docking station comprising the wireless charging module and an ethernet port having a power-on module contained therewithin, wherein the wireless charging module is connected to the power-on module of the ethernet port; and
- a Universal Serial Bus (USB) data module configured to transfer data to/from the docking station over a wired or wireless USB data connection;

wherein, in the sleep mode, the USB data module is powered off and the power module is powered on, whereby the mobile device is charged from the docking station over the power transfer connection, the mobile device configured to
- receive an information-containing wake-up control signal from the docking station over the power transfer connection; and
- control, in response to receiving the information-containing wake-up control signal, the USB data module that is configured to receive power from the wireless charging module and to thereby, configured to wake the mobile device from the sleep mode, wherein:
- the information-containing wake-up control signal is distinct from the power used for charging the mobile device; and
- the power transfer connection is a wireless charging connection provided via the wireless charging module and the information-containing wake-up control signal comprises a modulation in wireless charging or other messages across the wireless charging connection.

12. The mobile device according to claim 11, further comprising:
- a short-range wireless communication module configured for transferring data over a short-range wireless connection.

* * * * *